US006948186B1

(12) United States Patent
Brosey

(10) Patent No.: US 6,948,186 B1
(45) Date of Patent: Sep. 20, 2005

(54) MULTI-TASKING MESSAGE EXTRACTOR

(75) Inventor: Steven A. Brosey, Horsham, PA (US)

(73) Assignee: General Instrument Corporation, Horsham, PA (US)

( * ) Notice: Subject to any disclaimer, the term of this patent is extended or adjusted under 35 U.S.C. 154(b) by 811 days.

(21) Appl. No.: 09/684,287

(22) Filed: Oct. 6, 2000

Related U.S. Application Data

(60) Provisional application No. 60/158,032, filed on Oct. 7, 1999.

(51) Int. Cl.[7] .............................................. H04N 7/173

(52) U.S. Cl. ...................... 725/151; 725/100; 725/131; 725/139; 725/151

(58) Field of Search .............................. 725/87, 91, 92, 725/93, 94, 95, 100, 107, 111, 117, 54, 131, 725/133, 139, 141, 153; 370/395.64, 402; 348/467

(56) References Cited

U.S. PATENT DOCUMENTS

| | | | | |
|---|---|---|---|---|
| 5,754,651 | A * | 5/1998 | Blatter et al. | 380/241 |
| 5,838,873 | A * | 11/1998 | Blatter et al. | 386/95 |
| 5,844,595 | A * | 12/1998 | Blatter et al. | 455/83 |
| 6,101,192 | A * | 8/2000 | Wakeland | 370/429 |
| 6,249,526 | B1 * | 6/2001 | Loukianov | 370/442 |
| 6,317,885 | B1 * | 11/2001 | Fries | 725/109 |
| 6,477,185 | B1 * | 11/2002 | Komi et al. | 370/536 |
| 6,650,710 | B1 * | 11/2003 | Hamery et al. | 375/240.29 |
| 6,680,952 | B1 * | 1/2004 | Berg et al. | 370/467 |

FOREIGN PATENT DOCUMENTS

| | | |
|---|---|---|
| EP | 0905983 A2 | 3/1999 |
| EP | 0915617 A2 | 5/1999 |
| WO | WO 98/16067 | 4/1998 |
| WO | WO 99/37048 | 7/1999 |

OTHER PUBLICATIONS

Written Opinion from International Preliminary Examination Authority, dated Sep. 26, 2001.

International Preliminary Examination Report, dated Feb. 19, 2002.

* cited by examiner

*Primary Examiner*—Kieu-Oanh Bui
(74) *Attorney, Agent, or Firm*—Steven L. Nichols; Ronald P. Kananen; Rader, Fishman & Grauer PLLC

(57) ABSTRACT

An apparatus and method for extracting messages from a data stream has multi-tasking capabilities for accommodating a greater number of data streams and for combining data from different streams. The message extractor includes a packet identifier filter, a control message processor, and two buffers, each buffer divided into a plurality of address locations associated with a plurality of channels. One buffer is used to store extracted message portions, and the other buffer is used to store state data corresponding to the extracted message portions. The control message processor includes a single message processor that is shared by all of the message extraction channels associated with the device. As message portions are filtered and captured, they are stored into the first buffer, while the state data is stored in the second buffer. As additional message portions are received, the system uses identifying data in the data stream to match new message portions with message portions that have already been received and stored to form complete messages. A multi-tasking message extractor reduces the cost of performance by only requiring one message extractor attached to less expensive RAM rather than increasing the number of message extractors themselves.

42 Claims, 12 Drawing Sheets

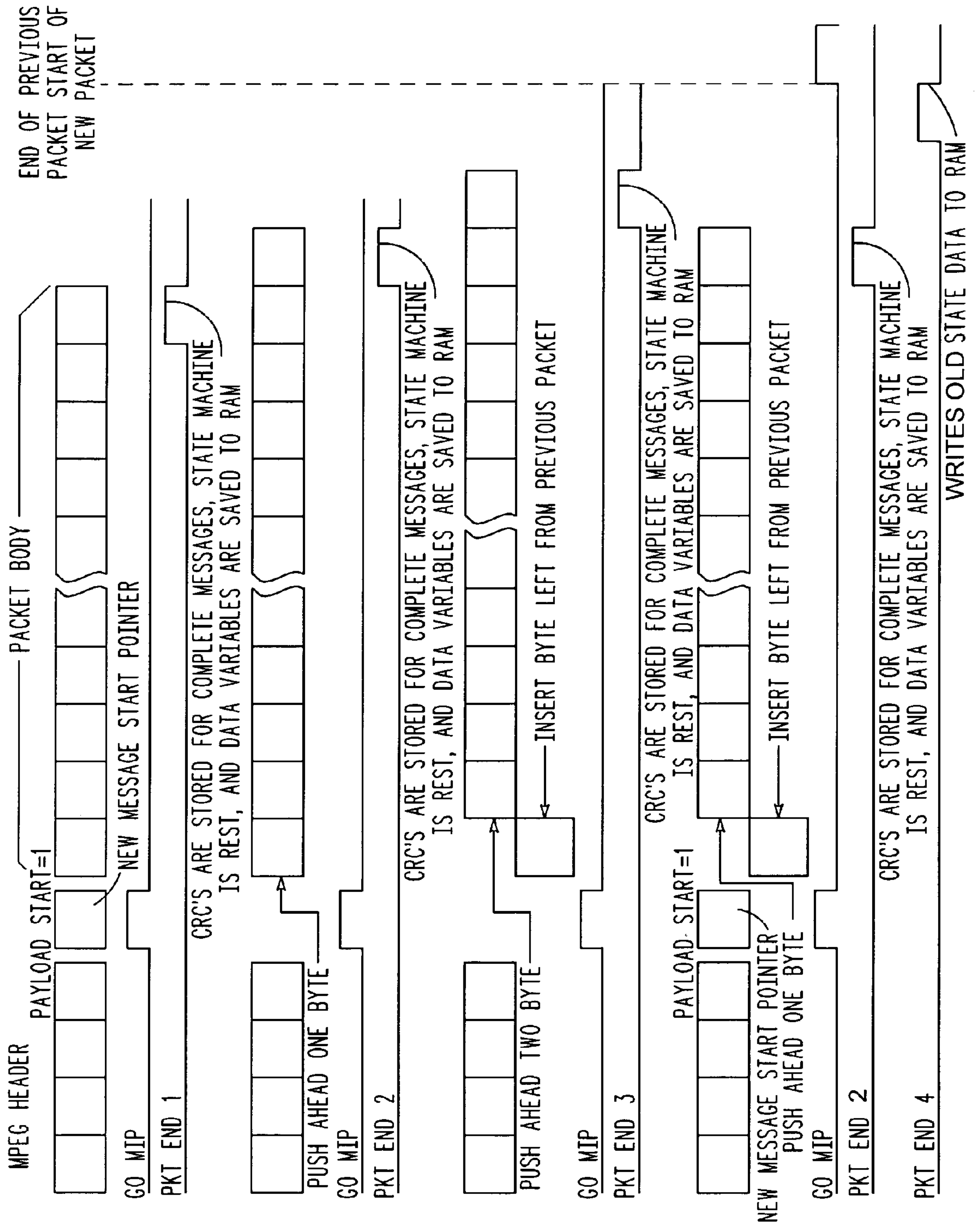
Fig. 5A PACKET PROCESSING TYPE 1
Fig. 5B PACKET PROCESSING TYPE 2
Fig. 5C PACKET PROCESSING TYPE 3
Fig. 5D PACKET PROCESSING TYPE 4

MULTI-TASKING MESSAGE EXTRACTOR

REFERENCE TO RELATED APPLICATIONS

This application claims the benefit of U.S. Provisional Application No. 60/158,032, filed Oct. 7, 1999, the disclosure of which is incorporated herein by reference in its entirety.

TECHNICAL FIELD

The present invention relates to the field of message extractors for extracting messages from an input data stream, and more particularly to a message extractor for use in higher-performance applications, such as head-end applications.

BACKGROUND ART

Application specific integrated circuits (ASICs) are often used to extract data, such as packet data, from data streams. Message extractors are often used in set-top devices for receiving cable signals to obtain video and audio data as well as subscriber information corresponding with a given set-top device. Head-end devices have many more functional requirements than basic set-top devices, including re-multiplexing, encryption, and decryption functions, and therefore require more message extractors to accommodate the increased number of functions. The re-multiplexing function in particular requires more message extractors in the ASIC because re-multiplexing requires the device to extract services and messages from a greater number of data streams and to combine them into different data streams.

Adding more message extractors to accommodate the increased functional requirements of head-end devices, however, require additional ASIC space, on the order of 7–8K ASIC gates per message extractor. To conserve ASIC space while maintaining the re-multiplexing function, a processor that performs the re-multiplexing function may continuously reassign the message extractors to reference different packet identifiers at different times to extract the needed messages from the data stream. Using the processor to reassign message extractors, however, reduces the amount of time that the processor can devote to perform core tasks related to the re-multiplexing process itself, reducing the speed at which messages are received and processed.

There is a need for a device that can accommodate the greater message extraction requirements of head-end devices for, e.g., re-multiplexing, encryption and decryption, without consuming additional ASIC space or sacrificing processor speed.

SUMMARY OF THE INVENTION

Accordingly, the present invention is directed to a message extraction apparatus and method having improved message extraction capability. More particularly, the invention is directed to an apparatus for extracting messages from a digital data stream containing messages, comprising: a message processor that receives the digital data stream and extracts message portions from the digital data stream; a first buffer having a plurality of locations associated with a plurality of channels to store the extracted message portions; and a second buffer having a plurality of locations associated with the plurality of channels for storing state data corresponding to the extracted message portions. By extracting and storing the message portions and their associated state data in separate buffers, the system can assemble complete messages from multiple channels in a multiplexed fashion.

One embodiment of the invention is directed to a device for extracting messages from a data stream, comprising: an input interface that receives packet data in the data stream; a packet identifier filter coupled to the input interface to selectively filter the packet data and having the packet identifier filter having a CPU interface to allow communication between the device and a CPU; and a message processor that receives the selectively filtered packet data from the packet identifier filter and that is configured as a plurality of channels. The embodiment also includes a first buffer for storing the extracted message portions and a second buffer that stores state data corresponding to the packet data being processed until an entire message has been completely processed, even if the components of the messages are distributed over multiple packets in the data stream. The invention also includes a method for extracting messages from a data stream, storing message portions into an internal buffer, and storage message processor states corresponding to the message portions in an external buffer until an entire message has been processed.

By storing the states and content of incomplete messages as they arrive in the packet data, the inventive system can process multiple messages without requiring multiple message extractors because the multi-tasking features of the inventive system store incomplete messages and their states as other messages are being processed and then reloads the incomplete message data at a later time to complete processing. The multi-tasking message extractor according to the present invention reduces the cost of performance by only requiring one message extractor attached to a less expensive RAM rather than multiple message extractors.

BRIEF DESCRIPTION OF THE DRAWINGS

FIGS. 5A though 5D show various ways in which data packets can be shifted by the inventive device;

DETAILED DESCRIPTION OF THE PREFERRED EMBODIMENTS

Figure 1A:
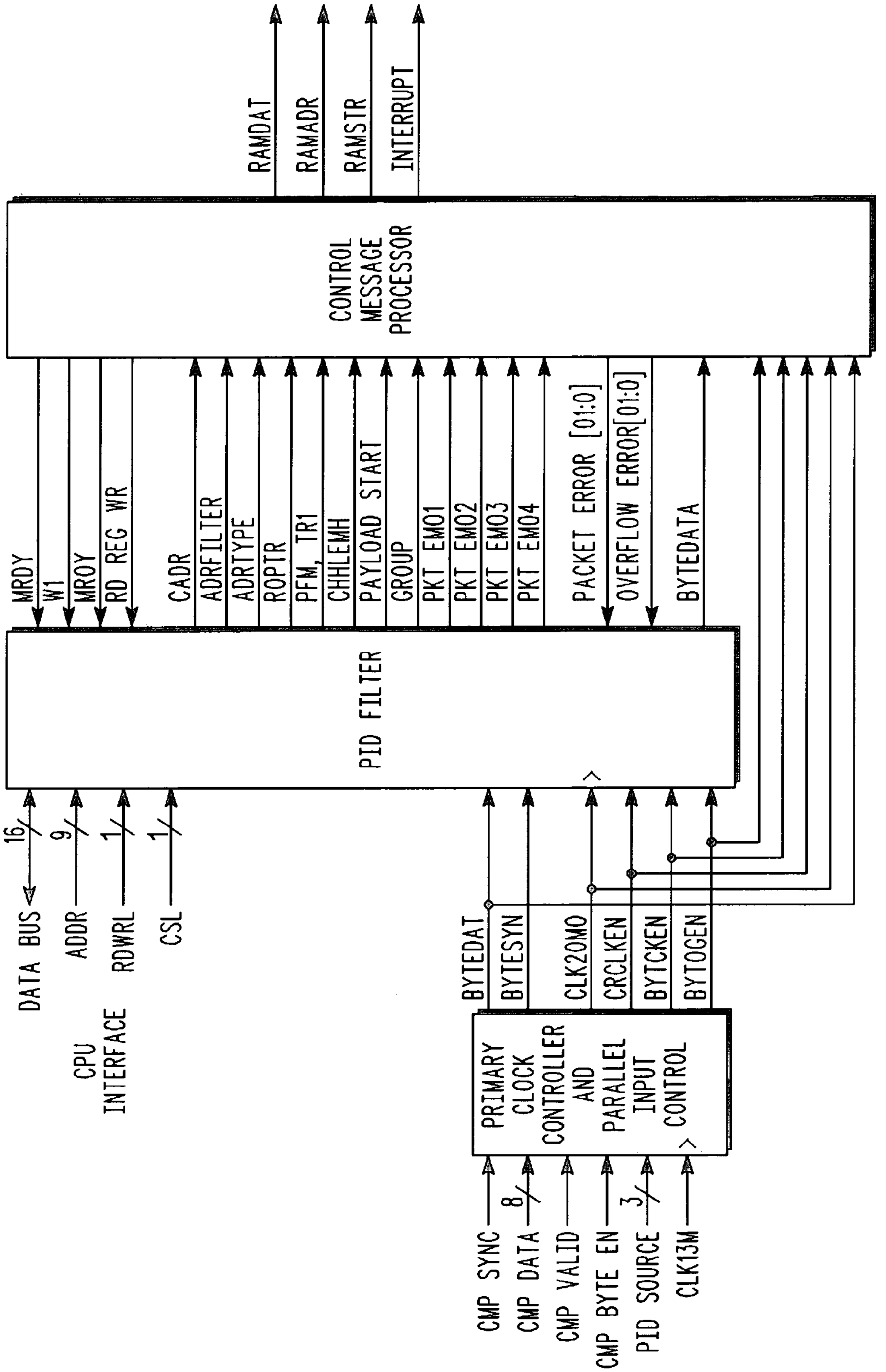
FIG. 1A is a representative block diagram of one embodiment of the inventive message processor.

The control message processor according to the present invention is preferably in the form of a programmable field gate array. The control message processor programmable field gate array (CMP-FPGA) is preferably designed to have features that would be compatible with head-end functional requirements. Generally, the purpose of the CMP-FPGA is to extract control messages out of a data stream, such as an MPEG input stream, store the messages in a message buffer store corresponding message states in a state buffer, and notify a central processing unit (CPU) that there are messages available for processing. More particularly, the CMP-FPGA according to the invention has one message processor shared among multiple channels, where every state of the message processor and all partially completed calculations are stored in a state buffer and where the extracted messages are stored in a message buffer. Both the state buffer and the message buffer are divided into a plurality of addressable portions, one portion per channel. The parameters for implementing message extraction features for head-end functions will first be described briefly and then the details of implementation will be described with respect to the Figures. A preferred CMP-FPGA according to the present invention filters messages in a data stream, such as an MPEG format video stream, rather than using software. The preferred features for address-type filtering include broadcast filtering and a filter provided for each channel in the CMP-FPGA for Unit Address 40, Network address 40, Multicast address 16, and/or all broadcast messages. Language filtering capability is optional in the inventive device and can be omitted with no adverse effect on the overall device.

The filtering process will be described in greater detail below. As a general matter, the filters in the inventive device, if enabled, will cause the device to save only the messages in which the address filter is enabled and in which the filter value matched with a predetermined data value. Another feature in the invention is that the filtering process is selectable; that is, the device can select whether to store all messages in the data stream received by the CMP-FPGA or only messages that correspond with predetermined message filtering parameters. The inventive device also preferably has single packet capture capability, where a single packet is captured and stored in RAM. Other functions in a preferred embodiment of the inventive device include cyclic redundancy checking (CRC) calculation and a message validation function that checks a header (e.g., a 4-byte MPEG header) before continuing with processing. The device preferably also has an error processing function that indicates the presence of any packet errors via error flags.

Data storage according to the claimed invention preferably uses a dual port RAM as the memory, with the message buffers being 2K or 8K circular buffers (the details of which will be described below), depending on the mode in which the inventive device is operated. For simplicity, the embodiment described below with respect to the Figures is designed to extract messages and packets from up to 32 different designated packet identifier sources out of an MPEG input stream. With this example, the device will use 32 processors when operated in the 2K mode and 20 processors when operated in the 8K mode. Of course, the invention is not limited to any specific number of processors or any particular message buffer size; these details can be modified without departing from the scope of the invention.

Figure 1B:
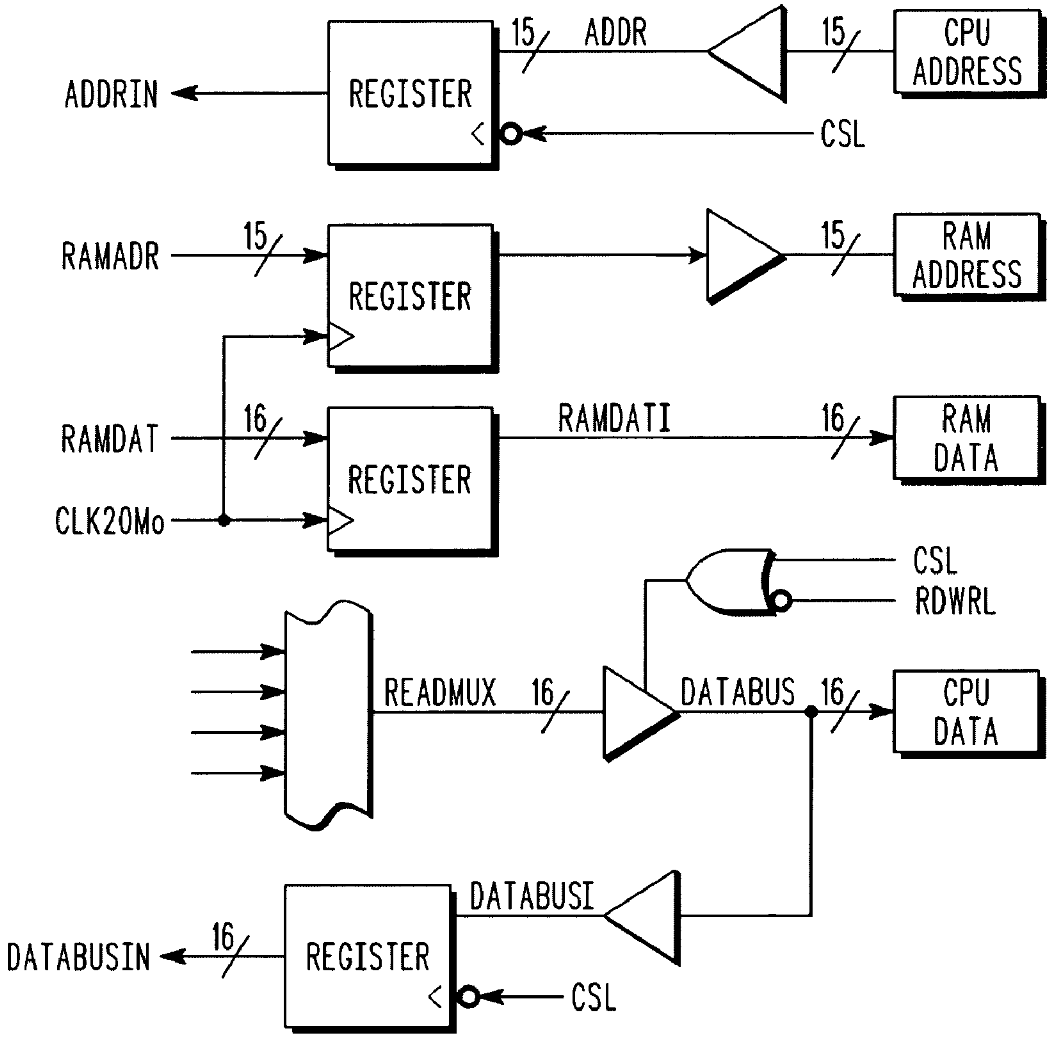
FIG. 1B is a block diagram of a central processing unit interface to be used in conjunction with the device shown in FIG. 1.

FIG. 1A is a representative block diagram illustrating the configuration of one embodiment of the present invention, and FIG. 1B illustrates a CPU interface that controls the reading and writing of data to and from the CMP-FPGA 100. In this example, the CMP-FPGA 100 is designed to extract messages from up to 32 different packet identifiers from a MPEG stream. The CMP-FPGA 100 may be configured as 32 channels, with a 2K circular buffer provided for each channel or with 2K circular buffers for 16 channels and 8K circular buffers provided for 2 channels as the message buffer for storing extracted messages. The packet data input into the device 100 can be one byte wide infobus data having a data validation signal for validating bytes of data in each packet. This validation feature allows the input data flow to be interrupted without corrupting the packet.

Figure 2:
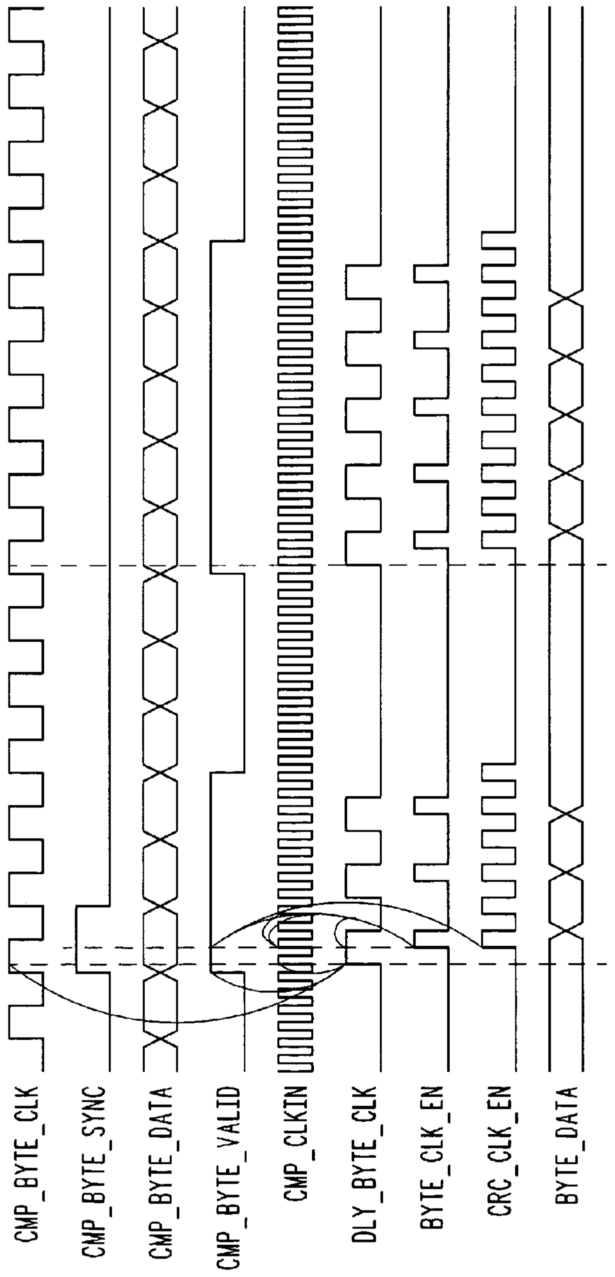
FIG. 2 is a timing diagram illustrating re-synchronization of byte data before it is sent to filters in the inventive system.

The CMP-FPGA 100 generally includes three modules: an input interface 102, a packet identifier (PID) filter 104, and a message processor 106. The message processor 106 is shared by all 32 different message extraction channels and, as noted above, can therefore extract messages from up to 32 different packet identifiers from a data stream. The input interface 102 receives multiplexed data having packet identifying information (PID) and stream identifying information (PID_SOURCE) that uniquely identify within a given stream similarly named packets from different streams apart. Both the packet identifying information (PID) and the stream identifying information (PID_SOURCE) are necessary because packets in different streams may have the same packet identifier (PID), making the stream identifying information necessary for the processor to tell them apart. The multiplexed data preferably has already been converted into parallel packet data as individual bytes of data accompanied by an enable signal for validating each byte of data in the packet. As each byte is received, BYTE_CLK_EN and CRC_CLK_EN enable signals are generated from a combination of the CMP_BYTE_VALID and CMP_BYTE_CLK signals, as shown in FIG. 2.

Figure 3:
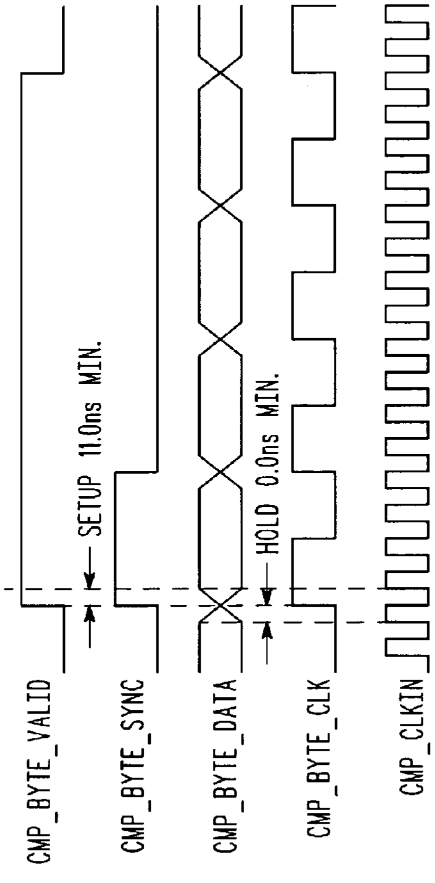
FIG. 3 is a timing diagram illustrating the timing used to generate internal clock enable signals in the invention.

Once the interface generates the BYTE_CLK_EN and CRC_CLK_EN enable signals, the CMP_BYTE_DATA and CMP_BYTE_SYNC signals are re-clocked using the generated enable signals, as shown in FIG. 3. The CMP_CLKIN in this example is a 13.5 MHz clock. The CMP_BYTE CLK, CMP_BYTE DATA, CMP_BYTE SYNC, and CMP_BYTE VALID all should have a minimum of 11.0 ns setup and 0 ns hold. As can be seen in FIG. 3, the timing of the re-synchronized CMP_BYTE_DATA and CMP_BYTE_SYNC signals correspond neatly with the CMP_CLKIN and CMP_BYTE_CLK, as compared with the timing diagram in FIG. 2. The re-synchronized byte data is then sent to the PID filter module 104 for additional processing.

Figure 4A:
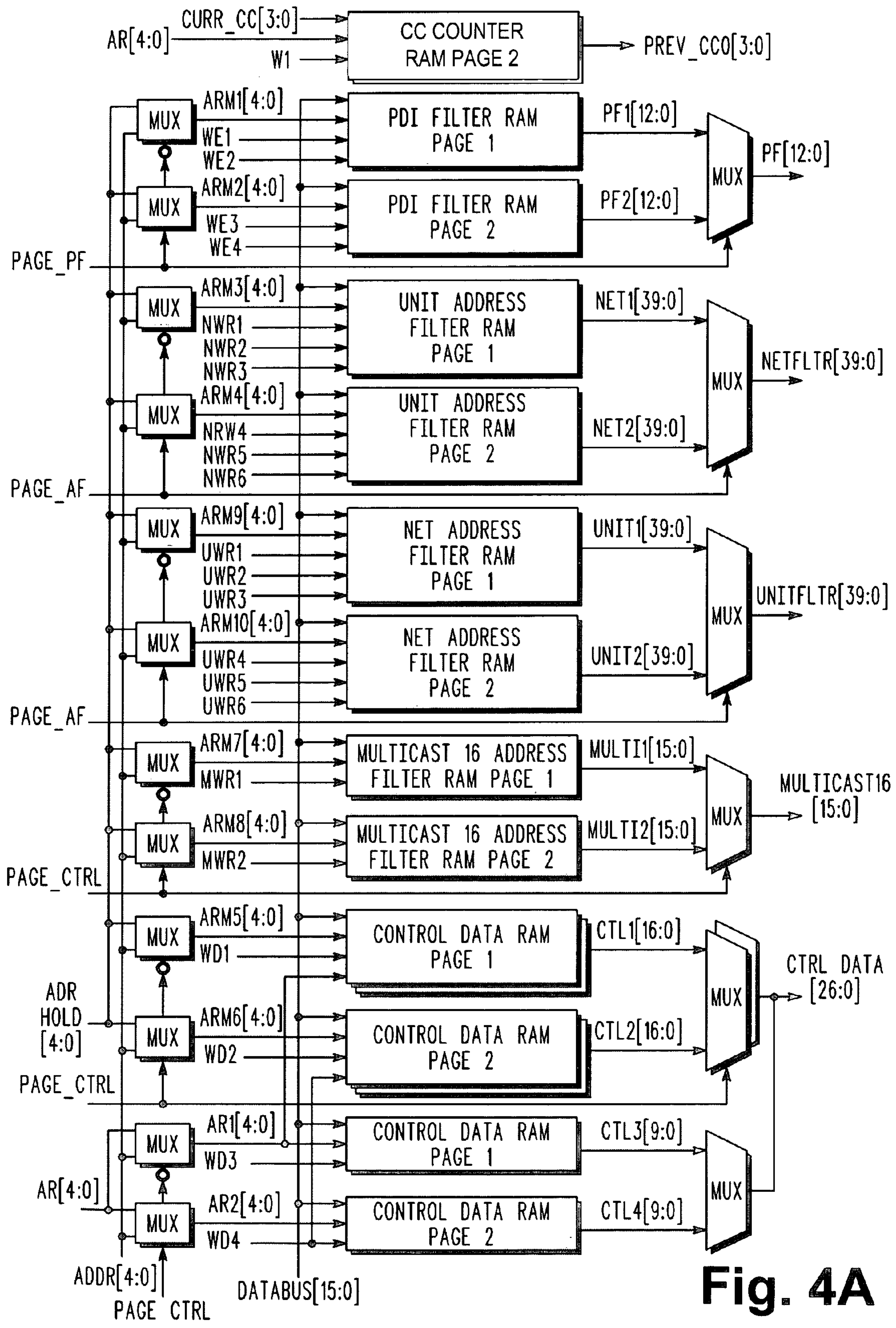
FIGS. 4A and 4B are diagrams illustrating the memory structure and control structure of filters used in the invention.
Figure 4B:
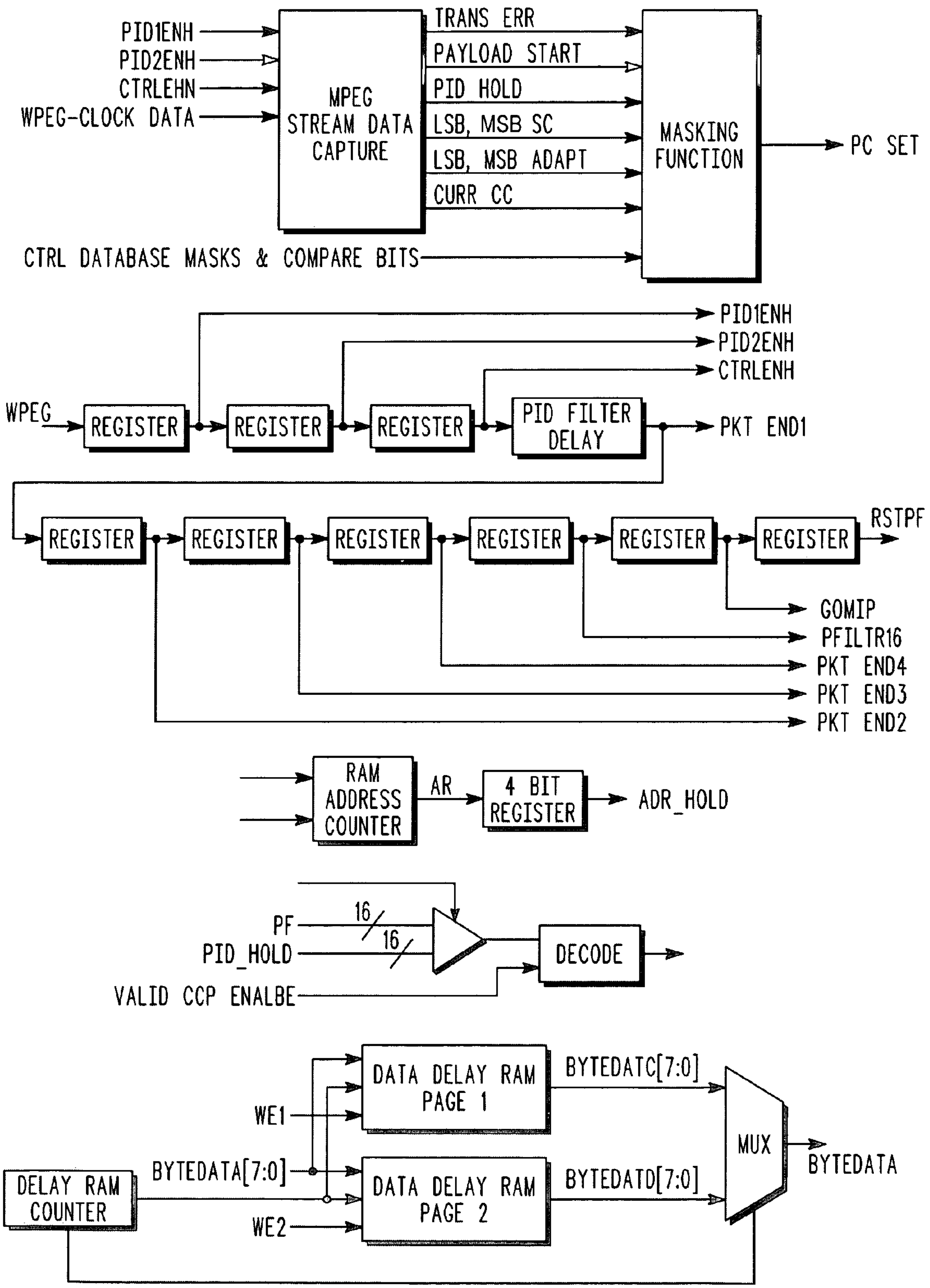

Next, the CMP-FPGA packet identifier (PID) filter 104 provides mode, filtering, enable and masking control for each message processing channel. Each channel can be independently programmed for any mode by the PID filter 104. FIG. 4A is a representative diagram of the RAM that acts as the message buffer and FIG. 4B is a control diagram of the PID filter 104. In this example, there are either 32 or 20 programmable message processing channels, depending on the storage mode in which the CMP-FPGA 100 is operated. More particularly, there are two different storage modes that control the depth of the circular storage buffer for each channel as well as the number of channels are available. If the storage mode for the message buffer is set for 2K, for example, then all 32 channels are available with a 2K circular buffer for message storage associated with each channel. If the mode is set for 8K, however, then only 16 channels are available with a 2K circular buffer for message storage, and 4 channels are available with an 8K circular buffer for message storage.

The PID filter 104 also has two different modes, a capture mode and a message mode, identifying the type of data that will be stored in the message buffer. The capture mode allows a full packet, except for the sync byte in the packet, to be captured and stored in one of the channel's buffers. The capture mode may filter any bit in the 3 control bytes of the MPEG header in the packet or mask any bit in the header to turn the masked bits into "don't care" bits. In the message mode, the messages contained in the packets are allowed to be processed either with or without address filtering. The address filtering function may be turned on or off via a control RAM interface. If the address filtering function is turned off, all messages received by the PID filter 104 having active packet identifiers is sent to the message processor 106 (indicated in FIG. 1 as BYTEDATA) If the address filtering is turned on, however, only messages with one of four selected allowable address types will be sent to the message processor 106 as BYTEDATA for storage. In one embodiment, the allowable address types are the following: Unit address 40, Multicast 16, and Broadcast. In this example, the Broadcast address type is always processed, while the other 3 address types are processed only if the address type has been selected and the address is defined in the CPU.

The PID filter module provides the filter control through a single RAM having multiple addressed locations and that acts as the message buffer for storing messages from up to 32 different channels. The message buffer can be partitioned into two pages so that the CPU may write filter control information into one page while the internal processor uses the other page. After the CPU writes all of the filter control information into the message buffer, it changes the page at the timing of the sync of the incoming data stream. The PID filter 104 may also have a 32-stage pipeline delay to allow each of the 32 different programmable PIDs to be compared with the incoming packet ID. If the programmed PID matches the incoming packet identifier, and 3 bit source identifier (PID_SOURCE), the PID RAM address count is latched. The latched data is used to provide the channel address to the control channel processor RAMs in the message processor 106. As part of the PID checking process, the entire header in the packet is checked to determine if the packet is valid. During the validation process, the packet being checked must meet one or more predetermined conditions, such as whether the error bit in the packet is inactive and whether the scramble control bits indicate that the packet is not scrambled. If the channel is enabled and if the packet meets the predetermined conditions on a channel by channel basis, the packet is sent to the message processor 106 for address filtering, message validation, and storage in the message buffer.

If the PID filter 104 sets a packet capture mode (which will be described in greater detail below), the PID filter 104 validates the entire header before the capture function is initiated. Each control bit may be explicitly compared or, if the bit is a "don't care" bit, masked. To carry out the packet capture function, the PID filter 104 must first confirm that the channel is enabled, the packet capture mode is enabled and all filters masks are programmed.

Referring now to FIGS. 5A through 5D and FIG. 6, the PID filter 104 provides START and END signals for the four different types of transitions moving from packet to packet, processing messages. These signals are used during the header bytes (e.g., 4 bytes in the case of MPEG packet data), which allow enough time for the PID filter 104 to transition to the next packet for message processing. Old control variable states are stored and new control variable states are loaded for each channel during this time to and from the state buffer, which is separate from the message buffer described above.

The message processor 106 extracts the desired messages from the data stream. As a general matter in this example, each message extraction channel has a dual function. The message extraction channel may be configured to extract a single packet and store it to the message buffer, or it may be configured to extract the messages that reside inside the packets. Messages extracted from packets may be filtered by address; alternatively, the address filtering function may be turned off to receive all messages that reside in the packet, without any filtering.

More particularly, each one of the message extraction channels may be filtered according the following parameters: PID value; Unit address 40; Network address 40; Multicast 16 address; and/or all broadcast messages. Of course, other parameters may be incorporated into the filter if desired. The CMP-FPGA is programmable to either capture all messages or capture messages based on the message address filters. Each message extracted from the MPEG stream is stored in a circular buffer message buffer. When each of the 32 message channels are configured with a 2K circular buffer size, the maximum message size allowed in the 2K buffer is 1K. Channels in the 8K buffer mode will accept messages up to 4K in size.

The message processor 106 conducts two independent processes. The first process counts down a new message start pointer (NMSP) and outputs a new message interrupt signal (NEWMIP). The second process involves processing and storing the message itself by extracting the messages and storing them into circular buffers on word boundaries. Each of these processes will be described in greater detail below.

With respect to the new message pointer process, the process is activated when a payload start indicator in the message processor 106 and the NMSP byte value are not equal to zero. If the NMSP byte value does equal zero, the message processor 106 bypasses the new message pointer process altogether. If the NMSP value is greater than the packet length, the new message pointer process will be terminated at the end of the packet.

FIGS. 5A through 5D illustrate different boundary conditions where the data is shifted to avoid corrupting the message being processed. More particularly, FIGS. 5A and 5D illustrate shifting when a new message start point (NMSP) byte is located between a header portion and a body portion in the packet, while FIGS. 5C and 5D illustrating shifting when a byte left over from a previously-processed packet is inserted in the packet body. As can be seen in FIGS. 5A through 5D, the packet includes a 4-bit header 500 and a packet body 502. The operation of the message processor 106 is initiated by one of three conditions. One condition initiates message processor operation when (1) a "go to message processor" (GO_MP) signal is high; (2) the channel corresponding to the packet being processed is enabled; (3) a payload start signal is high; and (4) the NMSP byte equals zero. The message processor 106 may also begin operation simply when the NEWMIP signal is high. Alternatively, the message processor 106 begins operation when (1) a message in progress signal MIPO is high; and (2) the GO_MIP signal is high.

The message processor also has several priority interrupts that restart message processing. The top priority interrupt occurs if the read pointer and write pointer ever overlap the 2K/8K circular message buffer. Before the address of the 2K/8K message buffer is overlapped, the process will immediately exit, discard the current message in the buffer, and send an overflow error signal to the PID filter 104.

The next types of interrupt is an end of packet indicator PKT_END signal. The PKT_END signal is an output signal after selecting one of four different PKT_END signals PKT_END 1–4, depending on the boundary condition experienced while processing the packet. When PKT_END 1–3 occur, all state data of the current process are stored in the state buffer and the state of the process is returned to idle, while when PKT_END 4 occurs, the old state data is written to the state buffer. Generally, when PKT_END occurs, all states of the current process are stored in the state buffer and the process state of the message processor is returned to idle.

In FIG. 5A, the NSMP byte is inserted in between the header 500 and the body portion 502 of the packet, and the GO_MIP signal is high at the location of the NSMP byte. The PKT_END signal goes high at the end of the packet body, at which the CRCs are stored for complete messages, the state of the message processor is returned to idle, the message data is saved to the message buffer and the current state data is saved to the state buffer. FIG. 5B shows a situation where there is no NSMP byte at the point that the GO_MIP signal is high; in this situation, the packet body 502 is pushed forward one byte and the PKT_END signal goes high when, as in the FIG. 5A, the message processor reaches the last byte of the packet body 502. FIG. 5C shows a situation where a byte from a previous packet has not been processed yet before the new packet is read; in this case, the byte from the previous packet is inserted in between the header and body of the new packet, pushing the bytes in the new packet forward two bytes. FIG. 5D shows a similar situation as FIG. 5C except that a NMSP is inserted in between the header and the byte from the previous packet. Note that in FIG. 5D, there are two PKT_END signals that initiate writing of state data to the state buffer. The PKT_END 2 signal corresponds to the end of the packet and, like the examples above, causes storage of the CRCs for complete messages, saving the current state data to the state buffer, and setting the state of the message processor back to idle. The PKT_END 4 signal, however, initiates writing of the state data for the previous packet to the state buffer as well.

Another type of process interruption occurs when the message process receives a new message interrupt signal (NEWMIP) from the first process, which counts down the new message start pointer NMSP, while a packet is being processed by the second process. This interrupt can occur any time that a packet is being processed for a message. If NEWMIP occurs as a message being processed, then the current message will be discarded, a packet error flag will be set, and a new message process will be started. If no message is being processed or a message extraction has just successfully completed when the NEWMIP occurs, then a new message will start with no errors generated.

Figure 6:
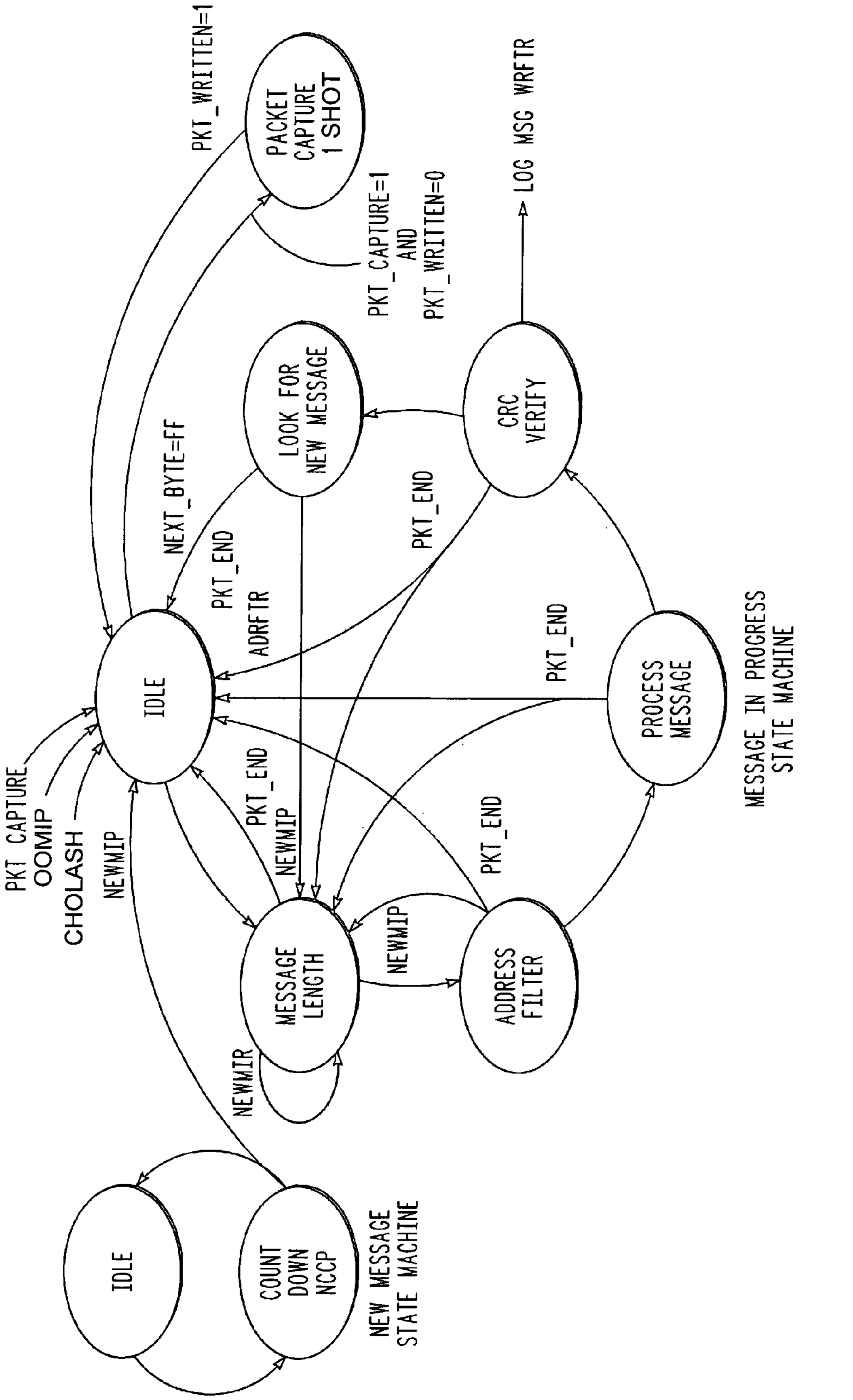
FIG. 6 is a state diagram illustrating the operation of the inventive message extractor.

The process states of the message in the inventive system is shown in FIG. 6. States corresponding to each packet will be stored in a state buffer as it is processed.

The first process state 600 in the message processor begins by moving between an idle state 602 and a state in which the new message start pointer NSMP is counted down 604. Once the NMSP byte reaches zero, the new message interrupt NEWMIP signal is output from the count down state 604 in the message processor and transitions the message processor into its second process state 606, which again starts as an idle state 608. The message processor uses the NMSP to find the start of a new message at state 610. When the start of the new message is located, all of the information about the message (e.g., message length, and address type) is extracted. The message processor then compares the address type with predetermined expected address types and jumps to the address filter state 612 if corresponding address types match; if not, the message processor waits for the PKT_END signal and returns to idle once it is received from the PID filter. The addresses are compared with the filter addresses during the address filter state 612, and if an address filter matches the address, then the processor jumps to the process message state 614; if not, the message processor waits for the PKT_END signal and returns to idle 108 once it is received.

In the process message state 614, the message length is counted down to the 4 bytes of CRC data, and then the message processor jumps to the verify CRC state 616. The calculated CRC is compared with the CRC at the end of the extracted message. If they match, then the message processor has extracted the message successfully.

Once the message is extracted and verified at states 614 and 616, respectively, the message processor begins searching for a new message in the data stream at state 618. If no new message is found, the message processor waits for the PKT_END signal and returns to the idle state 608 once it is received. If the message processor does locate a new message, however, the NEWMIP signal goes high and the message processor returns to the message length state to restart the message extraction process for the new message. Note that during any of these states, a NEWMIP signal can cause the message processor at any time to leave the current state and return to the message length state 610, effectively abandoning processing of the message and resetting the state machine to initiate processing of a new message.

As can be seen in the Figure, the message processor also has an alternative packet capture control function at state 620, where the message processor stores only one packet in the state buffer and will not capture another packet until the previous packet state data has been read out of the state buffer. More particularly, the alternative packet capture function 620 allows the CPU to turn off message processing of any channel, capture a single packet, and store the captured packet to the message buffer. During this function, every control bit in the header bytes can be either be compared or masked; therefore, packets may be uniquely identified through a combination of compare bits and masks. The captured packet is preferably stored starting at address 0 of the message buffer associated with the captured packet's channel. During the alternative packet capture state 620, another packet will not be captured until the first packet has been read. Any messages not read or not complete when the packet capture function is initiated will be deleted and will not be stored in any of the buffers.

The "one shot" packet capture function 620 can be enabled on any of the channels. This mode selects a packet by filtering any bit in the 4 bytes of the packet header. These bits may be exact matches or the bits can be masked so they are ignored during the compare process in selecting a packet to save to the state buffer.

Note that for every state, the message processor may also log the message write pointer WRPTR and check to make sure that the write pointer and the address pointer do not overlap. If they do overlap, the message processor indicates an address pointer (ADRPTR) crash and returns to the idle state without saving the message. Thus the message processor returns to idle from any state when it receives either a PKT_END signal or a ADRPTR crash indication.

Figure 7:
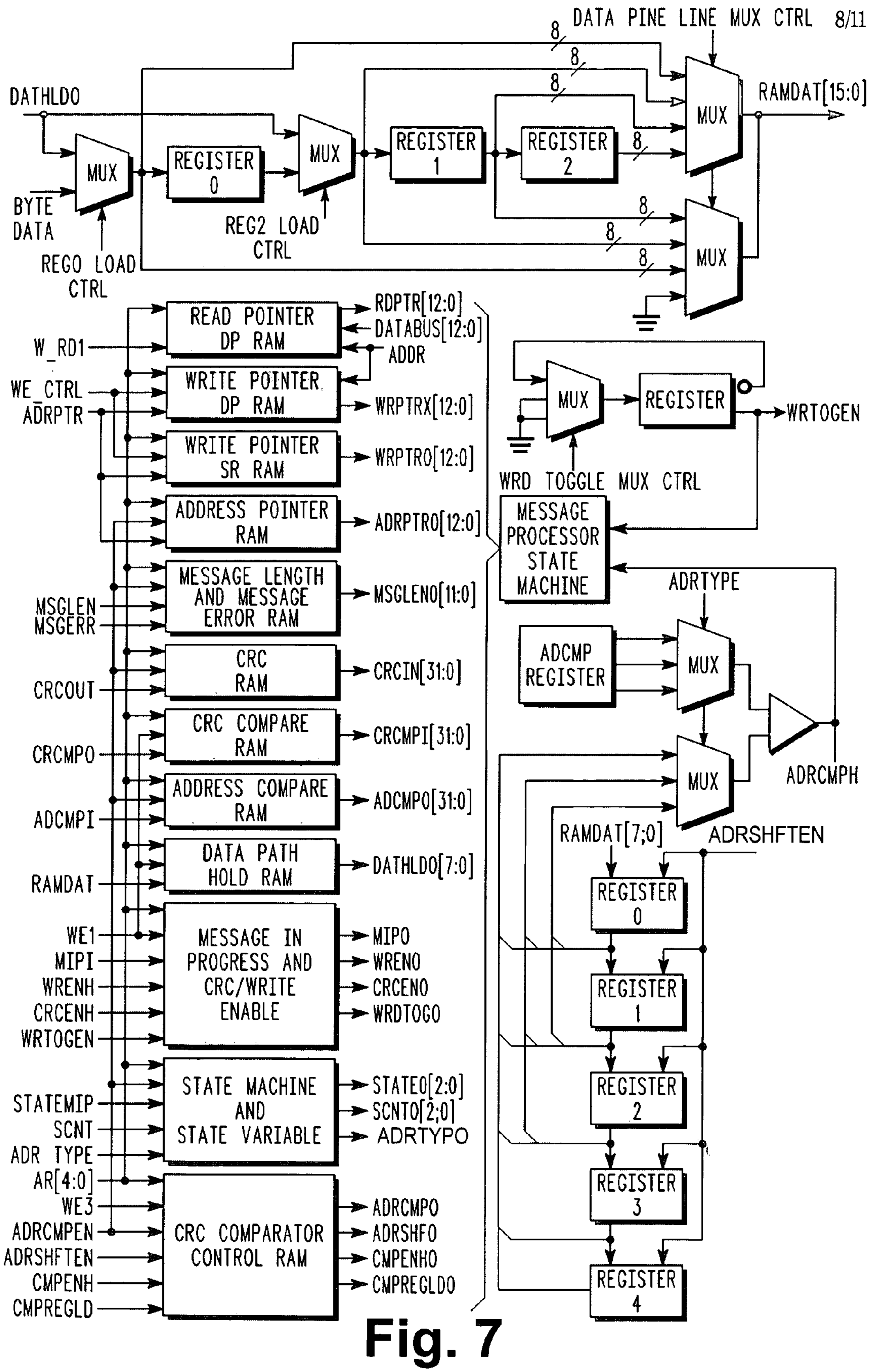
FIG. 7 is a diagram illustrating the RAM and address filter shift register in the message processor of the invention.

FIG. 7 illustrates the state buffer and address filter shift register for the message processor 106. As can be seen in FIG. 6, the CMP-FGPA 100 has only one message processor state machine 700, which is shared between 32 different channels. The 32 different channels are able to share the single processor 104 by saving every state of the message processor state machine 700 and all partially completed calculations in the state buffer. In this specific example, the state buffer is 32 locations deep to accommodate the 32 different channels and is as wide as needed to store every processing state corresponding with each channel. The state buffer address is latched by the latched counter value from the PID filter comparator circuit. At the end of each packet, the message processor stops the active state machine process (shown in FIG. 6), returns the state to idle, and saves all states at that point in the state buffer. When a new packet is ready to be processed, the message processor loads all of the previous state information in from the state buffer and continues processing the message in the new packet, shifting data as necessary as described above and shown in FIGS. 5A through 5D to avoid corrupting the message being processed. Further, as shown in FIG. 7 below, the BYTE_DATA multiplexer 702 modifies the data stream being processed by multiplexing different shifted versions of the data stream before the stream is processed by the message processor and the messages saved to the state buffer.

Figure 8:
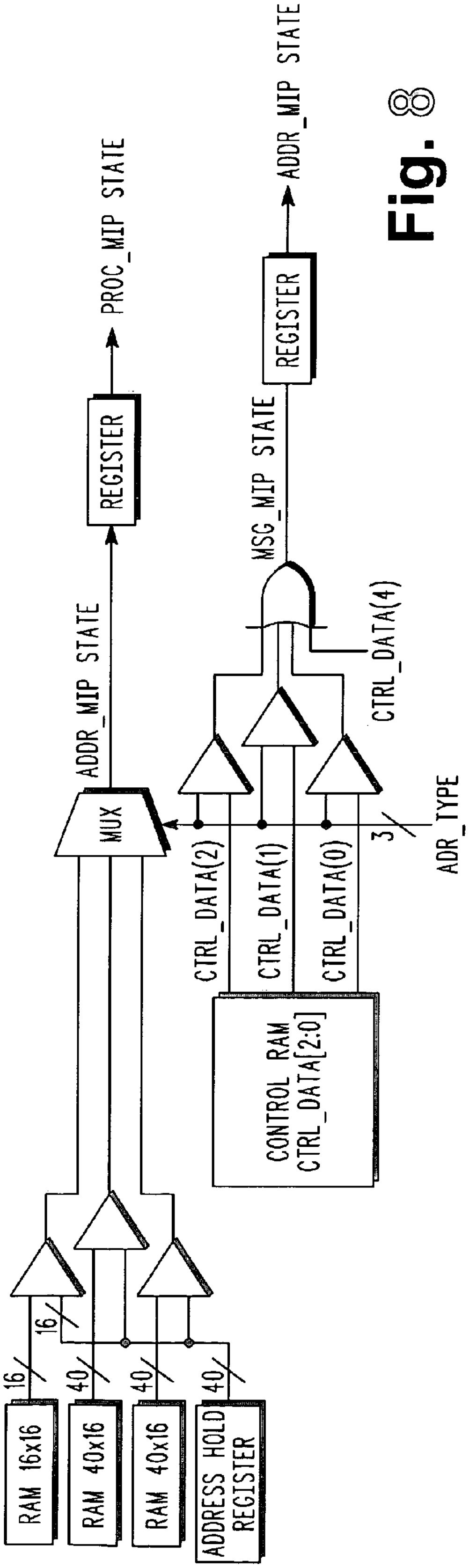
FIG. 8 is a diagram of an address filter control circuit in the invention.

FIG. 8 is a diagram of an address filter control circuit 800 in the message processor 104, which corresponds with the address filter state in FIG. 612. As explained above, the address filter control circuit compares the message address type against any or all enabled address types. The address filter control circuit 800 also compares the message address against any or all programmed address values. There are four address types available to be enabled by the address filter; broadcast address types are always enabled, while the other three address types mentioned above (Network address 40, Unit Address 40, and Multicast address 16) are enabled by programming a channel control RAM 802, and more particularly by linking an enabled bit in the control RAM 802 to a particular address type. If an address type is enabled, an address corresponding to the enabled address type must also be programmed for address filtering to take place. During the actual filtering process, if the address type of a received packet is valid, the message processor state will jump from the message length state 610 to the address filter state 612, as shown in FIG. 6. In the address filter state 612, the programmed addresses are compared with the message address extracted from the received message in a comparator. The comparator 804 outputs are sent to a multiplexer 806. If the comparators indicate that there is a match between the address of the received message and a programmed address, the message processor state machine jumps from the address filter state 612 to the message processor state 614.

If address filtering is disabled, however, all of the messages received by the message processor are treated like a broadcast message and no address comparisons are made. Disabling address filtering can be conducted by, for example, setting all of the control RAM 802 bits to 0. In this case, the state machine immediately jumps from the address filter state 612 to the message processor state 614 without any address comparisons taking place.

Figure 9:
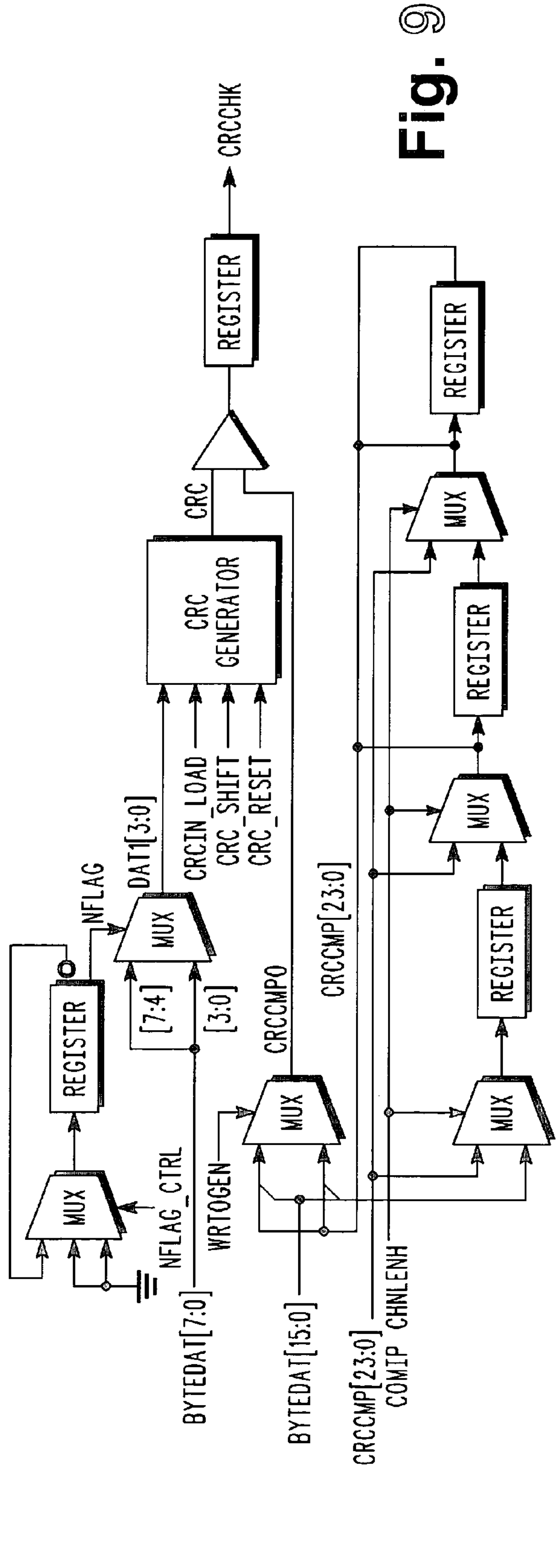
FIG. 9 is a diagram of a CRC and error checking circuit in the invention.

FIG. 9 shows a CRC and error checking circuit 900 in the message processor 106, which corresponds with the CRC verify state 616 shown in FIG. 6. During the processing of a message, each byte of the message is used to calculate a CRC. If the calculated CRC value matches the CRC embedded in the message, the message is deemed valid and the message processor proceeds to complete storage of the valid message and write the message buffer pointers corresponding to the valid message. Note that because all of the channels share the same CRC verification circuit 900, the CRC generator 902 and the CRC shift registers 904 in the CRC verification circuit 900 should be loadable. More particularly, the CRC circuit 900 should be able to stop message processing for one channel, save the state data corresponding to that channel in the state buffer, load and process a new channel, and resume processing of the previous channel without corrupting any messages or losing message information.

Figure 10:
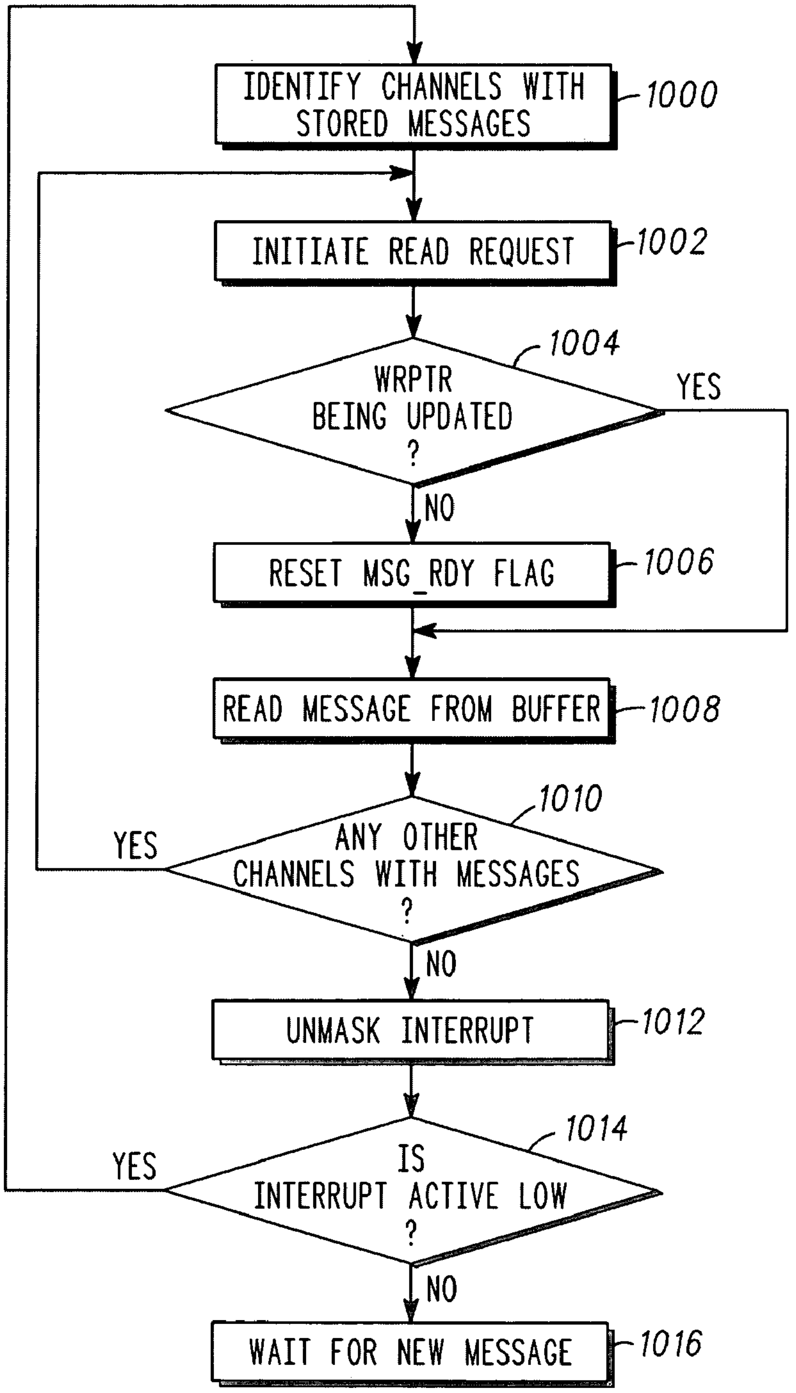
FIG. 10 is a flowchart showing a process for controlling the reading of message buffers in the invention.

To prevent loss of data while the message buffer is being read, the CPU preferably follows a process as illustrated in the flowchart in FIG. 10. Before reading the message buffer, it is assumed that the control channel processor has been reset and the message buffer is empty. Also, in this example, it is assumed that any incoming messages have already passed the address filtering and CRC verification stages successfully. When a control message processor interrupt signal is detected as being active low, the CPU has the option to mask the interrupt while processing messages. When a new message arrives at a particular channel, a message ready flag MSG_RDY associated with that particular channel goes high to indicate that the channel has a stored message. The CPU identifies all of the channels having stored messages at step 1000 and initiates a read request to read the read pointer RDPTR of the highest priority channel first at step 1002. This transfers the current write pointer into the WRPTR register.

If, for a given channel, the write pointer WRPTR was being updated at the same time that the read request is being processed, the MSG_RDY flag for that channel will not be reset at step 1004. If, however, the write pointer is stable, the MSG_RDY flag for that channel will be reset at step 1006.

The CPU then reads the WRPTR register corresponding to the same channel as the read request from previous step 1002. The CPU uses its internal value for the read pointer RDPTR plus a channel offset to locate a place to start reading the first message out of the message buffer at step 1008. Each message's length is determined by a message length value embedded in the message. There may be several messages in the buffer, and the CPU calculates the new value of the read pointer RDPTR from the old RDPTR value and the embedded message length value. The WRPTR value is used to retrieve all the messages in the channel being read and to calculate the RDPTR value it needs to write back to the control message processor.

After all the messages for that channel have been read from the message buffer, the CPU writes the RDPTR to the control message processor and checks to see whether there is another channel that contains messages to be read at step 1010. If so, the CPU moves to another channel and repeats steps 1002 through 1008 until all the messages have been read. Once all of the messages have been read, the CPU unmasks the interrupt at step 1012 and checks the interrupt status at step 1014. If the interrupt is still active low at the time it is unmasked, it indicates that new messages have been received during the previous message processing round. If this occurs, the CPU returns to step 1000 to initiate a new message processing round. If the CMP interrupt is inactive high at step 1014, however, it indicates that there are no new messages to be processed in any of the channels. In this case, the CPU can rest while waiting for the channels to receive new messages.

Figure 11:
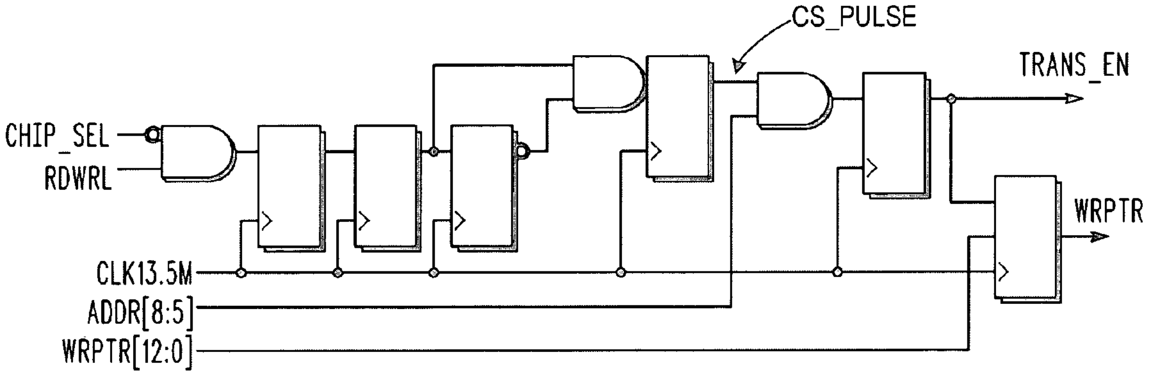
FIG. 11 is a message interrupt control diagram.

Referring now to FIG. 11, the MSG_RDY flags and the interrupt signal mentioned above with respect to FIG. 10 are generated by writing to a WRPTR RAM. The write pointer WRPTR is written by the message processor 104 at the completion of each message to the RAM address associated with its channel. Each of the 32 channels has its own associated MSG_RDY flag control circuit. The interrupt signal is generated by an OR gate that receives all the MSG_RDY signals as inputs, as can be seen in the Figure. When the CPU is interrupted, it reads a MSG_RDY register to determine which channels have messages ready. During the processing of each message, the CPU requests a read of the write pointer WRPTR. The WRPTR interface synchronously transfers the data into the WRPTR_HOLD_REG to be read by the CPU, and during this transfer the MSG_RDY flag is reset. If a new message is received during the data transfer, however, the MSG_RDY flag will not be reset. Processing of each message is completed by writing the read pointer RDPTR with the address location of the end of the message reading process.

Figure 12:
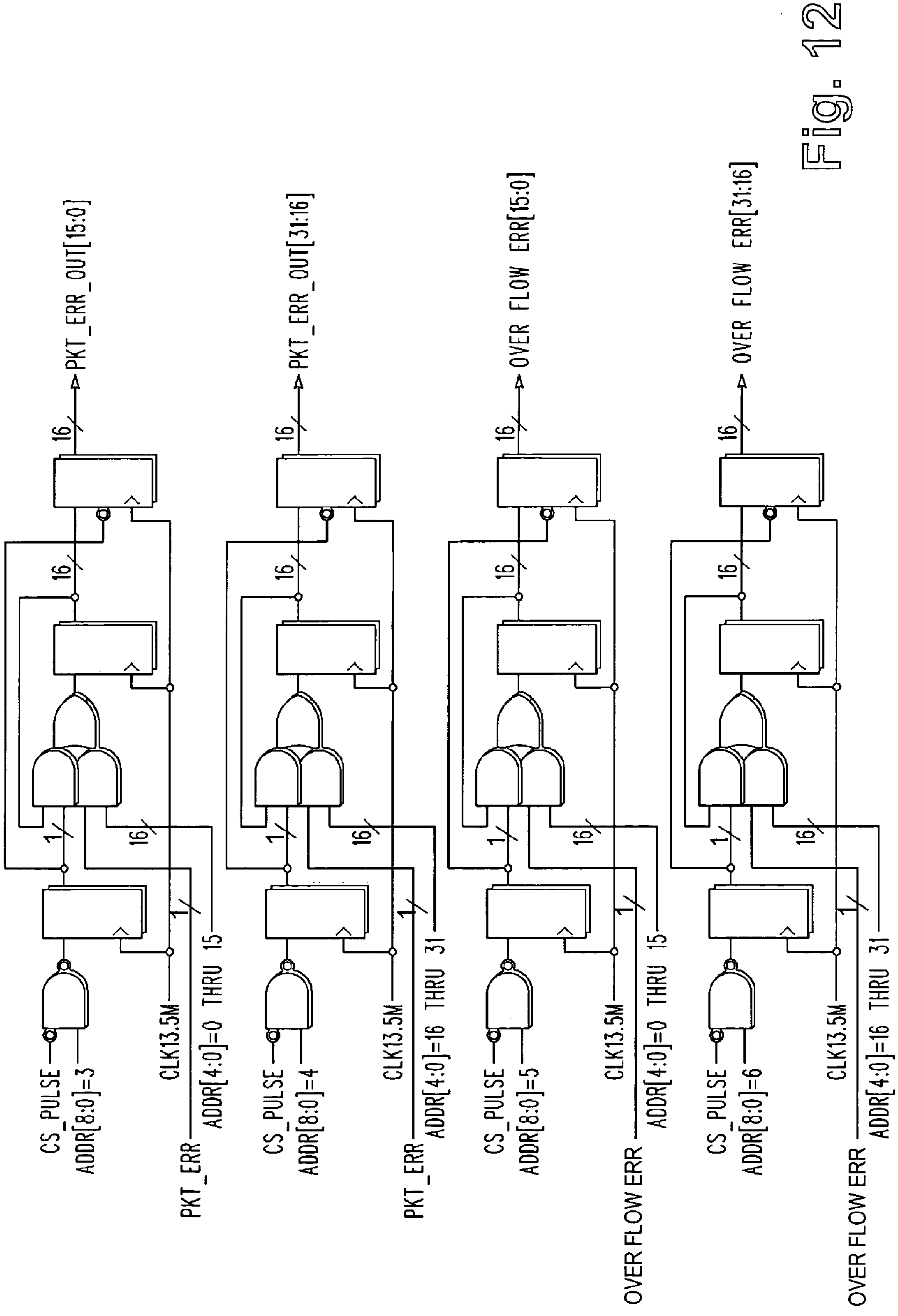
FIG. 12 illustrates a message error control circuit.

FIG. 12 illustrates a message error control circuit in the message processor 104. As noted above, the message processor identifies lost messages either due to corrupt packets or to buffer overflow. To accomplish this, the circuit shown in FIG. 12 includes two error circuits 1200, 1202 for each of the 32 channels. One error circuit 1200 generates a flag that identifies messages lost due to corrupt packets, and the other error circuit 1202 generates a flag that identifies messages lost due to overflow in the message buffer. These registers are set when an error is detected and cleared after the CPU has read the status of the registers.

Thus, the inventive system is a multi-tasking, multi-channel message extractor, expandable to any depth by increasing the depth of the RAM to obtain more message extraction. More particularly, the inventive system can extract and process a plurality of messages portions contained in packets in a multi-tasking fashion by using two separate buffers to store extracted message information and state data corresponding to the extracted message information, each buffer having a plurality of locations corresponding to a plurality of channels. This capability allows the inventive system to capture, extract, and assemble multiple complete messages from packet data in multiple streams.

A preferred multi-tasking message extractor according to the invention should take into account a number of parameters to achieve full functionally in a head-end application or any other application in which the inventive device will be used. For a typical re-multiplexing application, for example, there are more than 600 control states that should be stored and loaded in proper sequence for every packet in the data stream. Further, there preferably are 4-byte wide time slots in which to unload an old message in the process of being extracted, and in which to re-load an active message to be extracted. The invention is best implemented in a distributed RAM type FPGA/ASIC (ie. Xilinx, ORCA), although conversion to an ASIC is an option that would fall under the scope of the invention.

Those of skill in the art will understand that the inventive message extractor can be modified and altered in light of the foregoing disclosure without departing from the scope of the invention. For example, although the inventive message extractor has been described as extracting message from a data stream in the MPEG digital format, the extractor can be modified to extract messages from data streams in other formats, both currently known and subsequently developed. Additionally, the inventive message extractor can be used to extract messages from a signal, such as an MPEG signal, within a larger digital broadcast scheme, such as the Digital Video Broadcast (DVB) format (which uses the MPEG format as its video format). Thus, the present invention is not intended to be limited by any of the specific examples provided herein.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. An apparatus for extracting messages from a digital data stream containing messages, comprising:

a message processor that receives the digital data stream and extracts message portions from the digital data stream;

a first buffer having a plurality of locations associated with a plurality of channels to store the extracted message portions; and a second buffer having a plurality of locations associated with the plurality of channels for storing state data corresponding to the extracted message portions.

2. The apparatus of claim 1, further comprising a central processing unit interface for coupling the apparatus to a central processing unit.

3. A device for extracting messages from a data stream, comprising:

an input interface that receives packet data in the data stream;

a packet identifier filter coupled to the input interface to selectively filter the packet data, the packet identifier filter having a central processing unit (CPU) interface to allow communication between the device and a CPU;

a message processor that receives the selectively filtered packet data from the packet identifier filter and extracts message portions from the packet data;

a first buffer having a plurality of locations associated with a plurality of channels to store the extracted message portions; and a second buffer having a plurality of locations associated with the plurality of channels for storing state data corresponding to the extracted message portions.

4. The device of claim 3, wherein the input interface converts the packet data into parallel packet data.

5. The device of claim 4, wherein the parallel packet data is sent to the packet identifier filter with a enable signal to validate byte data in the packet.

6. The device of claim 5, wherein the input interface generates at least one clock enable signal to resynchronize the byte data.

7. The device of claim 3, wherein the packet identifier filter provides at least one selected from the group consisting of mode control, filtering control, enable control and masking control for each channel in the message processor.

8. The device of claim 7, wherein the mode control includes selecting one of a plurality of storage modes, each storage mode corresponding to a buffer size for the first buffer.

9. The device of claim 7, wherein the mode control includes selecting one of a capture mode, where the packet data is stored in the first buffer as a full packet without a sync byte, and a message mode, where messages in the packet data are allowed to be processed.

10. The device of claim 7, wherein the filtering control includes selecting whether address filtering is turned on or off, and wherein all messages in the packet data are processed when the address filtering is turned on and selected messages in the packet data are processed when the address filtering is turned off.

11. The device of claim 3, wherein the filter module has a pipeline delay to allow the packet identifier of an incoming packet to be compared with at least one predetermined packet identifier.

12. The device of claim 3, wherein the filter module validates the incoming packet by checking a header in the incoming packet with at least one predetermined condition.

13. The device of claim 3, wherein the message processor conducts a first process to find a start of a new message in the packet data and a second process to extract and store the message.

14. The device of claim 3, wherein the first buffers are circular buffers.

15. The device of claim 14, wherein the first buffer includes 32 available channels each with a 2K buffer for message storage.

16. The device of claim 14, wherein the first buffer includes 16 channels with a 2K buffer and 4 channels with an 8K buffer for message storage.

17. The device of claim 3, wherein the message processor includes:

a processor state machine shared between the plurality of channels, wherein the state data from the processor state machine is stored in the second buffer;

an address filter control circuit; and a verification circuit that calculates a verification code and compares the calculated verification code with an embedded verification code in the message portion in the packet data.

18. The device of claim 17, wherein the message processor further includes an alternative packet capture control that stops message processing for a single channel and captures a single packet for storage in the first buffer.

19. The device of claim 17, further comprising a buffer control that controls CPU operation while the at least one of the first and second buffers is being read.

20. The device of claim 19, further comprising a message ready interrupt control coupled to the buffer control, wherein the message ready interrupt control generates signals for determining which channels have messages that are ready for processing when the CPU is interrupted based on state data in the second buffer.

21. The device of claim 17, further comprising a message error interface for identifying the presence of lost messages.

22. The device of claim 21, wherein the message error interface includes a first error circuit that identifies messages lost due to corrupt packets and a second error circuit that identifies messages lost due to first buffer overflow.

23. The device of claim 22, wherein the first and second error circuits are provided for each one of said plurality of channels.

24. A method for extracting messages from a data stream, comprising:

receiving packet data in the data stream;

selectively filtering the packet data;

extracting at least a portion of a message from the packet data;

storing said at least a portion of the message in a first buffer associated with a message processor; and storing state data corresponding with said at least a portion of the message in a second buffer.

25. The method of claim 24, further comprising the step of converting the packet data into parallel packet data.

26. The method of claim 24, further comprising the step of providing at least one selected from the group consisting of mode control, filtering control, enable control and masking control for each channel in the message processor.

27. The method of claim 26, wherein the mode control step includes selecting one of a plurality of storage modes, each storage mode corresponding to a buffer size.

28. The method of claim 26, wherein the mode control includes selecting one of a capture mode, where the packet data is stored in the first buffer as a full packet without a sync byte, and a message mode, where messages in the packet data are allowed to be processed.

29. The method of claim 26, wherein the filtering control step includes selecting whether address filtering is turned on or off, and wherein the method includes the steps of processing all messages in the packet data when the address filtering is turned on and processing selected messages in the packet data when the address filtering is turned off.

30. The method of claim 24, further comprising the step of delaying the data stream to allow the packet identifier of an incoming packet to be compared with at least one programmed packet identifier.

31. The method of claim 24, further comprising the step of validating the incoming packet by checking a header in the incoming packet with at least one predetermined condition.

32. The method of claim 24, further comprising the steps of:

calculating a verification code; and comparing the calculated verification code with an embedded verification code in the message in the packet data.

33. The method of claim 32, further including the steps of:

selectively stopping message processing for a single channel; and capturing a single packet for storage in the first buffer.

34. The method of claim 33, further comprising the step of generating at least one signal for determining which channels have messages that are ready for processing when the CPU is interrupted.

35. The method of claim 32, further comprising the step of identifying the presence of lost messages due to at least one of corrupt packets and buffer overflow.

36. A device for extracting messages from a data stream, comprising:

an input interface that receives packet data in the data stream;

a message processor that receives packet data from the data stream and extracts message portions from the packet data;

a first buffer having a first plurality of locations each associated with a different incoming message where portions of that respective message are stored until that message is complete; and a second buffer having a second plurality of locations corresponding to the first plurality of locations, each location in said second buffer storing data specifying a state of the incoming message being stored in a corresponding location in said first buffer.

37. The device of claim 36, further comprising a packet identifier filter coupled to the input interface to selectively filter the packet data, the packet identifier filter having a central processing unit (CPU) interface to allow communication between the device and a CPU.

38. The device of claim 36, wherein said message processor signals a central processing unit (CPU) when an incoming message is completely recorded in said first buffer.

39. The device of claim 36, wherein each of said first plurality of locations corresponds to a different channel on which a message may be received.

40. The device of claim 36, wherein said message processor comprises a programmable field gate array.

41. The device of claim 36, wherein said first buffer is a circular buffer.

42. The device of claim 36, wherein said message processor verifies successful receipt of an entire message by performing a cyclic redundancy checking calculation on that message.

* * * * *